Jan. 3, 1961  J. MEDNEY  2,967,283
SLIP RING ASSEMBLY AND METHOD OF MAKING THE SAME
Filed July 17, 1957
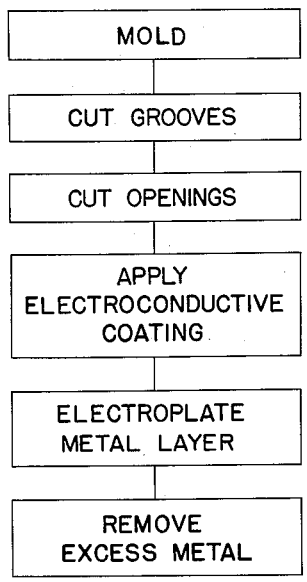
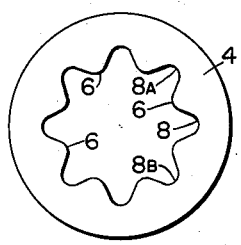
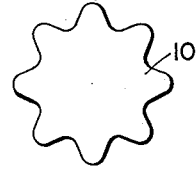
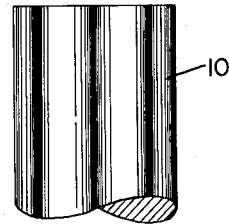
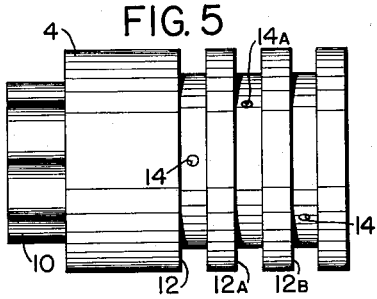
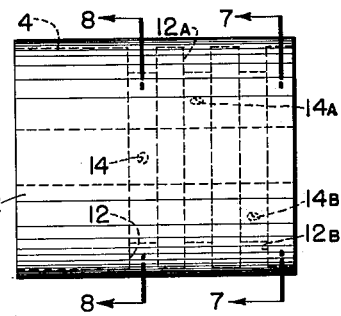
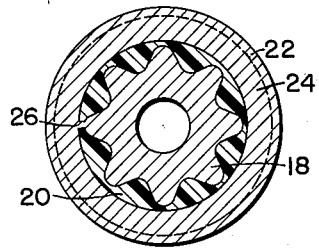
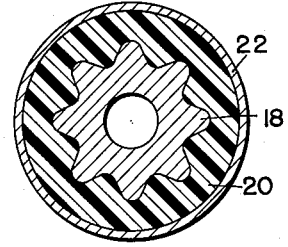
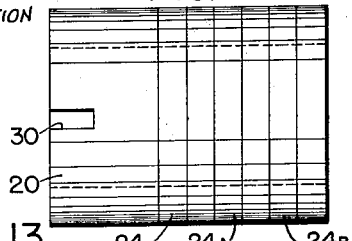
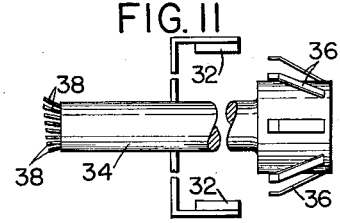
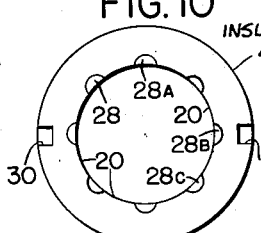
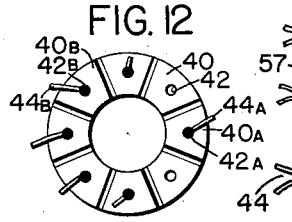
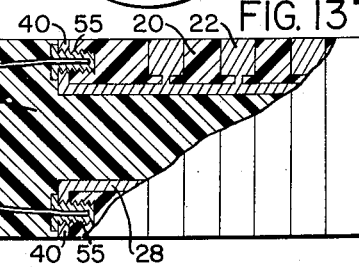
INVENTOR.
JONAS MEDNEY
BY
Leonard H. King

2,967,283
SLIP RING ASSEMBLY AND METHOD OF MAKING THE SAME

Jonas Medney, Oceanside, N.Y., assignor to Lamtex Industries, Inc., Westbury, N.Y.

Filed July 17, 1957, Ser. No. 672,448

5 Claims. (Cl. 339—8)

This invention relates to improved slip rings and a method of making same. In particular, but not limited thereto, this invention has particular utility in the production of sub-miniature slip rings.

Prior methods of making slip rings, some of which have an overall diameter of the order of 0.125 inch, include such techniques as encapsulating a bundle of fine wires in the center of a cylindrical core. A series of parallel circumferential grooves are then cut at right angles to the axis of rotation of the cylindrical plastic body. A number of holes are then drilled, one hole being located in each of the grooves to intersect a different wire. It may be appreciated that extreme skill is required to intercept a fine wire, say one only 0.008 inch in diameter. Since the expansion and contraction of the synthetic resin during molding would result in shifting of the wires, accordingly jigs, automatic positioning devices and the like cannot be employed for location of the drill for the drilling operation.

A conductive coating was then painted onto the groove, care being exercised to remove the coating in the vicinity of the exposed wire so that in a subsequent electroforming operation in which the wire was made the cathode, the electrodeposited metal bridged the gap from the wire to the conductive coating. The plating operation was then continued until the grooves were filled. A subsequent machining operation normally was carried out in which the outer surface of the cylinder and that of the deposited metal rings were cut in a lathe to provide a smooth surface.

This invention overcomes the manufacturing difficulties experienced by the prior art methods. In brief, this invention provides for the use of a hollow cylindrical insulator body. The inner surface of the cylinder is corrugated with axially deployed ridges and valleys so as to provide areas of different internal diameters. Circumferential grooves are cut into the outer wall of the cylinder and holes are drilled, one from each groove and each to a different valley. The entire structure, including the holes, is then coated with an electrically conductive coating. The coating is made the cathode in an electroplating bath and a solid metal layer electrodeposited so as to fill the grooves, holes and valleys. The outer surface is then machined and the inner surface of the cylinder reamed to provide isolated metal strips in each valley. The metal strips, metal plugs filling the drilled holes and the metal rings form a homogeneous monolithic structure.

Since the valleys are accurately formed by a mold, they may be employed as an accurate indexing means for automatic drilling machines. Contrary to the prior art method, ordinary skill is required for the carrying out of the drilling step.

The monolithic homogeneous construction of the conduction element is an important advantage over the prior art in that there is no tendency for separation of the element during subsequent operations as is common between the wire and the electroformed extension made by the prior art method. It may be appreciated that in general a rather insecure bond is formed between the extremely fine wire and the conductive coating of the prior art.

The further advantages, ease of fabrication and dependability of the present invention over the prior art, will be in part pointed out with particularity and will in part become obvious as the following description proceeds taken in conjunction with the accompanying drawings.

In the drawings:

Figure 1 is a flow chart of the steps of the invention.

Figure 2 represents an end view of a molded plastic body.

Figure 3 is an end view of a typical mandrel used for forming the interior cavity of a plastic member.

Figure 4 is a side view of the mandrel of Figure 3.

Figure 5 is a side view of the molded plastic body of Figure 2 showing circumferential grooves cut into body and a mandrel extending from the interior.

Figure 6 is a side view of the structure of Figure 5 after an electroplating operation.

Figure 7 is a section taken along plane 7—7 of Figure 6 while Figure 8 represents section taken along plane 8—8.

Figure 9 is a side view of a completed unit, Figure 10 being the corresponding end view.

Figure 11 discloses a mating plug especially adapted for use with the slip rings of this invention.

Figure 12 is an end view showing an alternative method of making connection to the member of this invention.

Figure 13 shows, partially broken away a completed slip ring assembly utilizing the embodiment of Figure 12.

Similar elements are designated by similar reference numerals throughout the drawings.

A chart showing the preferred method of carrying out the process is shown in Figure 1. A hollow cylinder 4 is molded of a suitable plastic to provide a corrugated interior configuration as is shown, for example, in the end view of Figure 2. It will be noted that corrugations are provided consisting of peaks 6 and valleys 8. In order to clearly indicate what portion is referred to hereinafter, the valley portion 8 will be noted to be the section having the greater internal diameter. In the claims the corrugations are described as axial channels with the valley portion comprising the "bottom portion" of an axial channel. This molding 4 may be made by injection molding utilizing conventional dies or by conventional extrusion molding methods. A preferred method, however, is to use pinion wire which is provided with the required corrugated surface, is of low cost, and is readily obtainable. A typical section of pinion wire is shown in Figures 3 and 4. This molding may be accomplished by casting or by conventional insert injection molding techniques. A further advantage of this method is that by providing a length of pinion wire extending from the molding 4 a convenient holding jig is provided which may be mounted in a conventional indexing head so that in succeeding operations it is simple to precisely index the molding 4 and drill through the walls as will be later disclosed in greater detail. The next operation consists of cutting, as for example on a lathe, a series of parallel grooves 12, 12a, 12b, etc. (Fig. 5). Holes are then drilled using mandrel 10 clamped into an indexing head which is rotated, step by step, so as to permit the drill to precisely intersect valleys 8, 8a and 8b, etc. In the drawings the holes are designated by the symbol 14, 14a and 14b respectively.

In the claims the resulting holes 14 are referred to as walled openings.

In the next operation, the entire plastic body is coated with a conductive coating. Several suitable coatings may be employed. For example, conventional conductive silver lacquers or the entire body may be silvered as by the conventional Brashear process. The Brashear process employs a silvering solution comprising a mixture of a reducing agent such as hydrazine sulfate solution in a silver nitrate solution. The cylinder is immersed in a quantity of the aforementioned silvering solution for a time of the order of two to three minutes to produce a satisfactory coating of silver. It is well known in the art that a successful silvering procedure requires that the article to be coated be scrupulously clean, and it is to be understood that conventional techniques for accomplishing this be employed.

The article is then placed in an electroplating bath in which the article, now completely covered with an electrically conductive coating, serves as a cathode and a metal plate is deposited over the entire surface. Plating is maintained until a solid deposit is built up both inside the cylinder and outside the cylinder, completely filling grooves 12, 12a, 12b, etc. and valleys 8, 8a and 8b. The coated cylinder is shown in a side view in Figure 6. In Figure 7 there may be seen the inner metal coating 18, insulator 20 and outer metal coating 22. In the section of Figure 8 which is taken through one of the grooves 12, there is clearly visible at a point coinciding with hole 14, the outer metal coating 22, the electrodeposited metal ring 24, inner deposit 18 and the electrodeposited connecting member 26. It may be appreciated that at this point there has been formed a monolithic homogeneous metal structure which is not as susceptible to breakage as the prior art device since there is no line of demarkation between an inner conductor and a deposited metal film. In a subsequent operation the outer surface of the cylinder is machined away to expose alternate areas of metal conductor 24, 24a, 24b and insulating plastic 20 Fig. 9. An internal boring operation removes the tips of the peaks so as to provide a plurality of isolated metal conductors 28. These metal conductors each connect to a different conductive slip ring 24a, 24b, etc. While the drawing shows eight such conductive strips, it is to be understood that in many applications a different number of slip rings may be provided and that for certain applications several slip rings may be connected to one conductive strip. The disclosed construction permits of the sectioning of the slip ring into two or more sections so that it may be employed as a commutator. In such applications provision may be made for the use of conductive members 28, 28a, 28b, etc., one for each commutator section, individual conductors 28, 28a, etc., being connected to isolated commutator segments. Likewise by the use of this technique, it is a relatively simple matter to interconnect either isolated sections of a particular slip ring with that of another slip ring through the use of conductive members 28, 28a, etc. lying beneath the sections of conductive member desired to be coupled. In the event that a particular conductive strip 28 is not common to two such sections it is a relatively simple matter to utilize one of the conductive members 24 as a connecting link between two conductive members lying under the respective sections.

Connection is commonly made to the slip rings in one of several ways. For example, leads may be brought out from the element or a separate set of stationary wipers riding on a ring member 24 may be used as the input or the output means. Most frequently it is desirable to bring the leads out. The structure of this invention lends itself to extremely simple and inexpensive coupling means as shown in Figs. 10 and 11, wherein there are provided keyways 30 and a special plug 34 having keys 32 adapted to mate with the keyways 30. Obviously the key and keyways may be interchanged without departing from the spirit of the invention. The insulator plug portion 34 is provided with a series of spring fingers 36 arranged to contact each of the conductive strips 28. Leads 38 make contact to spring fingers 36.

Still another method of making contact is to avoid removing the conductive metallized coating from the end of the cylinder during the trimming operation. Saw kerfs are then provided as shown in Figure 12 so as to isolate conductors 40, 40a, etc. which are connected to conductors 28, 28a, etc. respectively. Into conductors 40 etc. holes 42 are drilled. Leads 44 are then inserted into the hole and soldered into place by solder to provide a connection to conductor 40, and in turn to a slip ring.

For applications requiring extremely secure connections, it is prefered that a hollow screw-type bushing 55 (shown in Figure 13) be inserted into the plastic and that the lead then be soldered into the hollow bushing. In a preferred version of this unit shown in Figure 13 the interior cavity is filled with a resin 57 and leads 44 encapsulated to form a rigid structure.

It is within the scope of this invention to encapsulate a shaft in the hollow portion of the plastic slip ring assembly so as to permit the use of the device in a rotatable structure. Further, it should be noted that in lieu of the lead wires shown in Figure 12 the electrodeposited surface may be polished and serve as a commutator, connection being made to slip rings 24, etc.

Having thus disclosed the best embodiment of the invention presently contemplated, it is to be understood that various changes and modifications may be made without departing from the spirit of the invention.

I claim:

1. The method of making an element of a mechanism for conducting electricity between two relatively movable structures comprising the steps of:

forming an electrically non-conductive material into a body having an outer surface and an axial bore provided with an axial channel having a bottom portion extending radially into said body from the bore and an annular groove having a bottom portion extending inwardly from the outer surface of said body;

forming a walled opening in said body extending from said groove bottom portion and intersecting said axial channel bottom portion;

coating the internal and external surfaces of said body with an electrically conductive material;

electrodepositing a layer of electrically conductive metal upon said coating of electrically conductive material to form a substantially homogeneous monolithic electrically conductive element;

and mechanically removing said electrodeposited metal from other than said channel, opening, and groove.

2. The method of making an element of a mechanism for conducting electricity between two relatively movable structures comprising the steps of:

forming an electrically non-conductive material into a body having an outer surface and an axial bore provided with a plurality of axially oriented channels having bottom portions extending radially into the said body from the bore and separated by side walls of said electrically non-conductive material, and a plurality of annular grooves having bottom portions extending inwardly from the outer surface of said body;

forming walled openings extending through said body from the said bottom portions of said annular grooves and intersecting selected ones of said channels;

coating the internal and external surfaces of said body with an electrically conductive material;

electrodepositing a metal layer upon said coating to form substantial homogeneous monolithic electrically conductive elements;

and mechanically removing said electrodeposited metal from other than said channels, openings, and grooves.

3. In a process of forming electrical conductors, the steps of molding a cylindrical insulator plastic body about an axial mandrel having a series of longitudinal raised ribs, so as to form axial channels extending radially from an axial bore formed in said plastic body; forming circumferential walled grooves in said plastic body extending inwardly in a radial direction, forming openings intersecting said circumferential grooves and the interior of said plastic body at points corresponding to a channel formed by a rib of the said mandrel, depositing a conductive coating on the internal and external surfaces of said body, electroplating said conductive coating with metal, to fill the grooves, to a height exceeding the depth of said grooves, machining the outer portion of said cylinder and metal filling the grooves to isolate adjacent metal rings filling said grooves, and machining the bore of the plastic body to remove electrically conducting material from between adjacent channel portions so as to provide isolated side by side electrical conductors forming a substantially homogeneous continuous monolithic structure with the electroplated metal filling said grooves.

4. An apparatus for conducting electricity between two relatively movable structures, each of which has at least one conducting part in sliding friction contact with at least one conducting part of the other structure, said apparatus comprising:

a hollow cylindrical body of electrically insulating material having a longitudinal bore;

a plurality of said conducting parts having an annular configuration encircling said body in spaced relationship to each other;

a plurality of isolated axial channels extending radially from the bore into said body;

contact making members positioned in said channels;

a conductive member within said body extending between a said contact making member and a said conducting part, said conductive member, said contact making member, and said conducting part consisting of a one-piece monolithic substantially homogeneous metal member;

a mating plug assembly comprising an insulator plastic support member adapted to be at least partially inserted into said bore;

a plurality of electrically conductive spring fingers carried by said support member and arranged to contact said contact making members;

means for indexing said mating plug in said bore so that said spring fingers contact said contact making members;

and means for connecting said spring members to an external circuit.

5. An element of mechanism for conducting electricity between two relatively movable structures, each of which has a conducting part in sliding friction contact with the conducting part of the other structure, said element comprising:

a cylindrical body of electrically insulating material having a plurality of parallel annular grooves in an outer surface thereof, a plurality of isolated channels extending radially from a longitudinal bore formed in the interior of said cylindrical body and opening in said body communicating with said grooves and said channels;

and one-piece substantially homogeneous electroformed monolithic metal conductors positioned in said channels, said openings, said grooves, and extending outwardly from said bore at one end of said body to form a plurality of isolated contact making members.

References Cited in the file of this patent

UNITED STATES PATENTS

| | | |
|---|---|---|
| 1,299,851 | Mori | Apr. 8, 1919 |
| 1,767,715 | Stoekle | June 24, 1930 |
| 1,847,653 | Jones et al. | Mar. 1, 1932 |
| 2,473,526 | Hood et al. | June 21, 1949 |
| 2,683,112 | Reindl et al. | July 6, 1954 |
| 2,696,570 | Pandapas | Dec. 7, 1954 |
| 2,699,425 | Nieter | Jan. 11, 1955 |
| 2,786,985 | Merety | Mar. 26, 1957 |
| 2,793,178 | Morris | May 21, 1957 |

OTHER REFERENCES

New Advances in Printed Circuits, U.S. Dept. of Commerce, National Bureau of Standards, Miscellaneous publication 192, Nov. 22, 1948, pages 38–41.